A. L. SCHRAM.
APPARATUS FOR FORMING HOLLOW GLASS ARTICLES.
APPLICATION FILED JULY 6, 1911.

1,013,452.

Patented Jan. 2, 1912.

UNITED STATES PATENT OFFICE.

ALEXANDER LUMSDEN SCHRAM, OF HILLSBORO, ILLINOIS.

APPARATUS FOR FORMING HOLLOW GLASS ARTICLES.

1,013,452. Specification of Letters Patent. Patented Jan. 2, 1912.

Application filed July 6, 1911. Serial No. 637,196.

*To all whom it may concern:*

Be it known that I, ALEXANDER L. SCHRAM, a resident of Hillsboro, in the county of Montgomery and State of Illinois, have invented a new and useful Improvement in Apparatus for Forming Hollow Glass Articles, of which the following is a full, clear, and exact description, reference being had to the accompanying drawings, forming part of this specification, in which—

Figure 1:
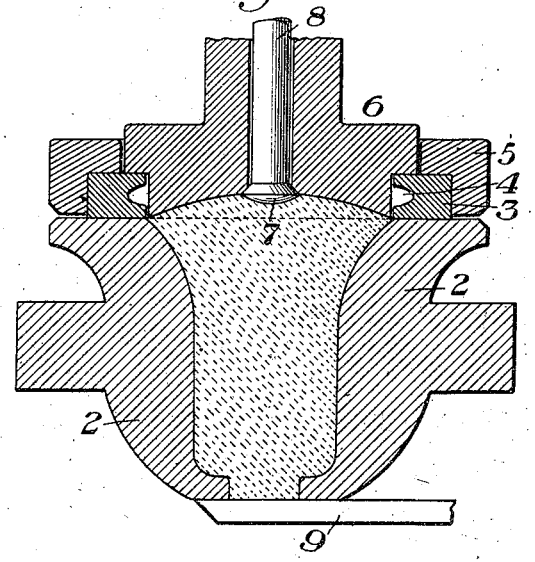
Figure 2:
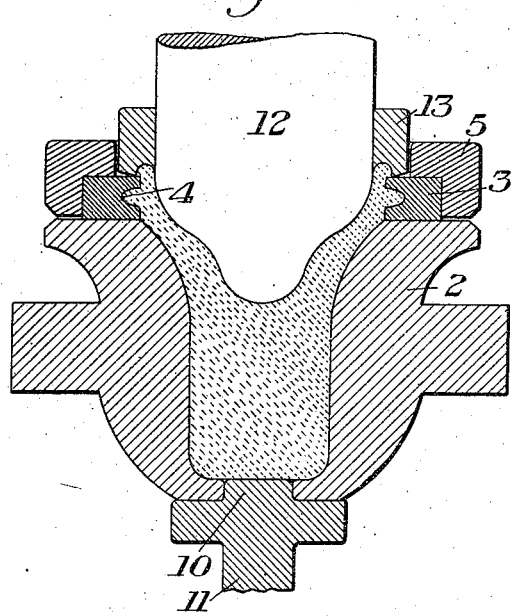
Figure 3:
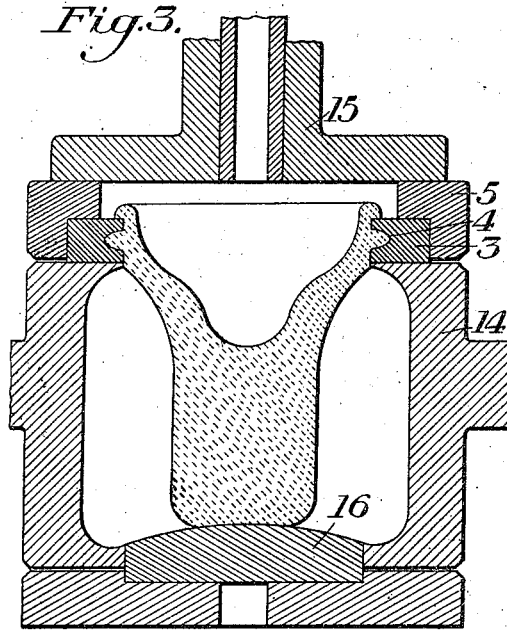
Figure 4:
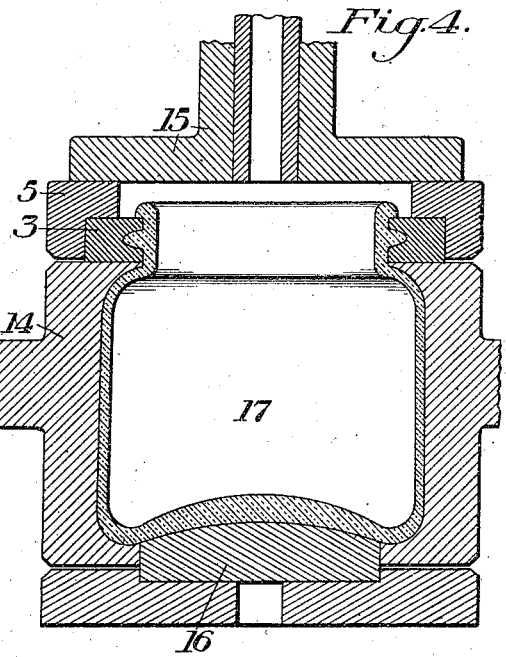

Figure 1 is a vertical section of the sucking mold which I prefer to employ; Fig. 2 is a similar view showing the pressing of the neck in the sucking mold; Fig. 3 is a similar view showing the sucking mold swung aside and the blow mold in place; and Fig. 4 is a view similar to Fig. 3, showing the formed article in the blow mold.

My invention relates to the forming of hollow glass articles by pressing and blowing and is designed to provide apparatus whereby such articles may be rapidly and efficiently produced.

In carrying out my invention, I employ the mold set forth in my copending application, Serial No. 603,133, filed January 17, 1911. In this method, I first suck the glass into a mold, without first shaping the glass to its final form in any portion thereof. The sucking mold is provided with a mold ring having a shaping recess, which recess, however, is shut off from contact with the glass during the sucking operation. This may be done by means of the sucking cap itself which covers the recess. After the glass is sucked into the mold and cut off, the sucking cap is removed and the upper portion of the glass is pressed into the form of the open neck and mouth of the article. The sucking mold halves are then removed and the parts of a blow mold are placed around a blank, which hangs suspended from the mold ring of the sucking mold. The blank is then expanded, preferably by the usual blowing mold, to shape it to the form desired in the blow mold.

In the drawings, 2 represents a sucking mold which is formed in divided separable parts connected by hinging or in any other desirable way. On the body of the sucking mold 2 is seated a two-part mold ring, consisting of an inner ring 3, having a recess 4 to shape the neck of the article, and an outer inclosing ring 5, which is recessed to receive the divided shaping ring 3. Within the mold ring 3 fits the sucking cap 6, the lower part of which is reduced in diameter to fit within the ring and cover the recess 4. For making wide-mouthed receptacles, the bottom of this cap may be recessed upwardly in concave form, as shown, or otherwise, to increase the volume of the cavity in its upper portion and obtain the proper amount of glass for pressing the upper part of the article. In the form shown, the sucking cap has a central longitudinal hollow closed by the valve 7 at the lower end of the stem 8. This valve will be closed by the entering glass sucked in to form the blank, thus shutting off the suction when the blank cavity is filled. 9 indicates a cut-off device for severing the glass at the bottom of the mold when it is filled. After this blank mold has thus been filled with glass, the cut-off is replaced by a movable plug 10, mounted on any suitable stem 11, this plug preferably entering the lower part of the mold, as shown, to support the glass. The sucking cap is then removed, as, for example, by moving the blank mold to another station, and a plunger 12 is forced through a centering ring 13, which fits within the ring 5 and on the mold ring 3, as shown in Fig. 2. The upper portion of the glass is thus pressed into the recess of the mold ring and of the ring 13, to form the final shape of the neck and mouth of the article. The blank mold is preferably shaped so that the volume of its upper part is relatively larger than its lower part, in order to provide the proper amount of glass for the pressing operation. After the pressing operation, the parts of the blank or sucking mold are swung aside or otherwise separated, the plunger is raised, and the glass blank is supported by the plug 10 and the mold ring 3, into which it has been pressed. The parts of the blow mold indicated at 14, in Fig. 3, are then swung or moved into place around the body of the blank, preferably at another station in the machine. The plug 10 is then permitted to drop out and the blow-head 15 is brought into position on the mold ring. The plug 10 on which the blank has been supported is arranged to prevent the blank from elongating and swinging when transferring the blank from the pressing station to the blowing station. I have shown the blow mold as provided with a removable bottom plate 16, but the details of this mold may be widely varied without departing from my invention. After the blank has been inclosed by the blow mold, expanding pressure is supplied through the blow head to expand the body of the blank into the final article, as indicated at 17 in Fig. 4. The parts of the mold and mold ring are then separated and the article removed in the usual way.

The advantages of my invention result particularly from the sucking mold which forms no part of the article in its final form. By thereafter pressing the neck and mouth portion in this mold into final form, I insure the filling of the neck and mouth-forming portions of the mold, which are often not completely filled, where the parts are shaped during the sucking operation. I thus obtain an accurate shape and insure complete filling out of the neck and mouth of the article.

The use of the plug 10 serves to force the lower portion of the sucked blank back into the blank body before blowing, thus avoiding the formation of a rough bottom; and the plug 10 also serves as a supporting seat for the blank to prevent sagging and swaying of the blank when moving from one station to the next.

The invention may be applied to the manufacture of narrow-necked bottles or receptacles, as well as wide-mouthed bottles or receptacles, the blank mold, of course, being shaped according to the kind of article desired to be made.

Many variations may be made in the form and arrangement of the molds, the sucking means, etc., without departing from my invention.

I claim:

1. A sucking mold having a mold ring with an inner shaping surface, and means for covering said inner shaping surface of the mold ring during sucking of glass into the mold, substantially as described.

2. A sucking mold having a mold ring provided with an inner shaping surface, in combination with a removable sucking cap arranged to cover the shaping surface of the mold ring during sucking of glass into the mold, substantially as described.

3. A sucking mold having a mold ring adapted to coact therewith, the sucking mold cavity having no final shaping portion, and means for pressing a portion of the sucked blank into the coacting mold ring, substantially as described.

4. A sucking mold having an open end, a mold ring adapted to coact with said end, means for sucking the glass into the mold out of contact with the shaping mold ring, and means for pressing the glass in the sucking mold into the shaping mold ring at one end thereof, substantially as described.

5. The combination with a sucking mold, of a mold ring adapted to coact therewith, means for sucking glass into the mold out of contact with the mold ring, means for pressing the sucked glass into the mold ring, and a blow mold arranged to receive the mold ring and blank with its pressed end, substantially as described.

6. The combination with a sucking mold having open ends, of a mold ring at one end having an inner shaping surface, means for covering the shaping surface of said mold ring during sucking of glass into the mold, and a support adapted to support the other end of the glass article while hot, substantially as described.

7. The combination with a sucking mold having open ends, of a mold ring adapted to coact with the sucking mold, a plunger arranged to press the glass in the sucking mold into the mold ring, and a plug arranged to enter the other end of the mold and force the cut end of the glass up into the body thereof, substantially as described.

In testimony whereof, I have hereunto set my hand.

ALEXANDER LUMSDEN SCHRAM.

Witnesses:
J. J. FREY,
J. E. HITT.

Copies of this patent may be obtained for five cents each, by addressing the "Commissioner of Patents, Washington, D. C."